Sept. 7, 1948. G. A. LYON 2,448,537
WHEEL COVER
Filed Aug. 27, 1945
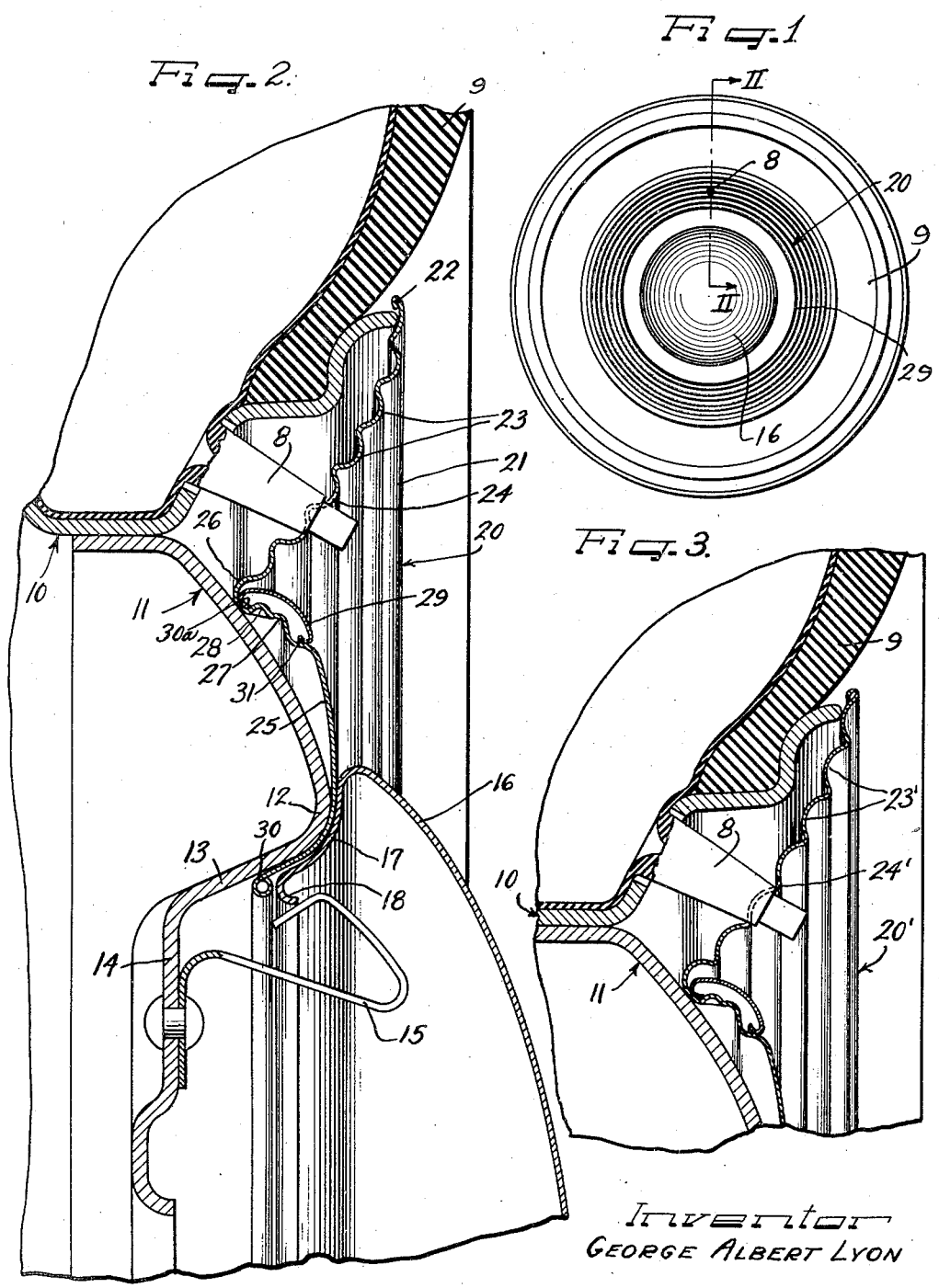
Inventor
GEORGE ALBERT LYON Patented Sept. 7, 1948

2,448,537

UNITED STATES PATENT OFFICE 2,448,537

WHEEL COVER

George Albert Lyon, Allenhurst, N. J.

Application August 27, 1945, Serial No. 612,842

6 Claims. (Cl. 301—37)

1

This invention relates to a wheel cover structure and more particularly to an ornamental cover for concealing exposed side flanges of a tire rim and an exposed portion of the body part of the wheel.

An object of this invention is to provide an improved annular wheel cover for ornamenting the outer side of an automobile wheel.

Another object of this invention is to provide for the rigidifying of a wheel cover in such a manner that relatively thin material, such for example as sheet metal, may be used in the fabrication of the same.

A still further object of the invention is to provide a wheel cover for concealing exposed outer side flanges of a tire rim part in such manner that the cover may be brought into close cooperation with the flanges and enable the use of a relatively short valve stem, rendered accessible by projecting through an opening in a cover portion.

In accordance with the general features of this invention there is provided in a cover structure for a wheel including multi-flange tire rim and body parts, a cover including an outer annular portion for disposition over exposed outer side flanges of the rim part and having an outer edge bearing on an outer flange of the rim part, and an inner margin directly opposite the body part, the cover portion extending axially and radially inwardly from the outer edge to said inner edge and having a plurality of concentric corrugations for rigidifying the cover; the cover also including a radially inner portion extending generally radially and axially inwardly for cover retaining cooperation with the body part of the wheel.

Another feature of the invention relates to the utilization of the bottom of one of the corrugations of the aforesaid structure to provide an opening through which a free end of a valve stem may project so as to render the valve stem accessible.

Other objects and features of this invention will more fully appear from the following detail description taken in connection with the accompanying drawings which illustrate several embodiments thereof, and in which Figure 1 is a side view of a wheel having a cover embodying the features of this invention;

Figure 2 is an enlarged fragmentary cross-sectional view taken on substantially the line II—II of Figure 1 looking in the direction indicated by the arrows; and Figure 3 is a fragmentary cross-sectional view

2 similar to Fig. 2 but showing a modification of the invention.

As shown on the drawing:

The reference character 9 designates generally a pneumatic tire and tube of the conventional type employed in automobiles and includes the usual valve stem 8. This tire is mounted in the usual way upon a drop center multi-flange tire rim 10, supported on a load-bearing or body part 11. The body part 11 comprises a dished metallic stamping and includes an axially outer turned nose portion 12, terminating in an axially rearwardly extending flange 13, which, in turn, ends in a generally radially extending bolt-on flange 14. This bolt-on flange 14, as is well known in the art, is adapted to be secured to a part on an axle by means of cap screws or bolts (not shown).

In addition, the flange 14 has attached thereto a plurality of generally axially extending hub cap retaining spring clips 15, which are now of a conventional construction. Each of these clips is of the so-called "inverted" type and is adapted to detachably hold a hub cap on the nose portion 12 of the body part.

I have designated the hub cap which is of a conventional construction, by the reference character 16. It comprises a metallic stamping and includes an underturned rear skirt 17 terminating in a turned edge 18 adapted to be cammed over the free extremities of the spring clips for retention of the cap on the wheel. This structure has been previously disclosed in numerous patents granted in the present wheel art.

My present invention is particularly concerned with the provision of a novel annular wheel cover 20, which may be made of any suitable sheet material, such for example, as metallic sheet or synthetic plastic sheet. I preferably, however, make the particular form shown in Fig. 2, of metallic sheet, and by reason of the manner in which the cover 20 is rigidified I am enabled to use exceedingly thin sheet material.

The cover 20 comprises an annulus and is of such depth as to conceal the exposed outer side flanges of the rim part 10 and the exposed portion of the body part 11, radially outwardly of the hub cap 16.

The cover 20 includes an annular portion 21 having an outer turned edge 22 adapted to overhang an outer edge of the rim part 10, and to bear against the rim part. The portion 21 is provided with a plurality of concentric corrugations 23, which so rigidify the portion 21 that it may be made of exceedingly thin sheet material. At least one of these corrugations is provided with an aperture 24 at the bottom thereof for receiving the free end of the valve stem 8. In other words, the free end of the valve stem 8 projects through a hole in one of the corrugations, and by reason of the fact that I locate this hole in the bottom of the corrugation I am enabled to use a relatively short valve stem.

The cover portion 21 extends generally radially and axially rearwardly from the turned edge 22 and terminates opposite the body part 11 in a radially inner cover portion 25, which in reality, extends in an opposite direction from that of the portion 21. The two portions, 21 and 25, may be said to extend from a common junction point in divergent directions. I have designated the turned recessed junction of the cover 20 by the reference character 26. The inner portion 25 of the cover has adjacent the turned junction 26 an annular generally axially extending shoulder 27 provided with a plurality of spaced radially outwardly extending protuberances 28 for retaining cooperation with an annular bead 29.

This bead 29 may be made of any suitable sheet material, such for example as stainless steel or strip, and is of a hollow construction. It includes an outer rearwardly turned edge 30 adapted to be sprung over the protuberances 28 for retaining cooperation therewith and an inner underturned edge 31 adapted to bear on a shoulder on the cover portion 25. This bead is easily applied to the cover by pressing it axially into retaining cooperation with the protuberances 28 and so that it is bottomed in the recess of the turned junction portion 26. Thus this bead serves not only to conceal the junction, but in addition, rigidifies the cover at the junction of the two portions 21 and 25.

The radially inner margin of the inner cover portion 25 terminates in a turned edge 30ª adapted to telescope the portion 13 of the body part 11. This arrangement is such that when the hub cap is snapped into retaining cooperation with the spring clips 15, it serves to clamp the inner portion 25 tightly against the nose portion 12 of the body part 11. In this manner, the spring clips are enabled not only to retain the hub cap on the wheel, but also retain the wheel cover 20 on the wheel.

In Fig. 3 I have illustrated a slight modification of the invention, wherein the same reference numerals are employed to designate parts common to this form of the invention and that illustrated in Fig. 2. The principal difference between this form of the invention and that of Fig. 2 relates to the construction of the outer annular portion 20' of the cover. In this portion, the corrugations 23' extend in an opposite direction from that of the corrugations 23 in Fig. 2. However, as in the case of the preferred form, an axially innermost portion of one of the corrugations is provided with an aperture 24' through which the free extremity of the valve stem 8 may project.

In both forms of the invention, the corrugations are employed to not only ornament the outer annular portion of the cover, but in addition to rigidify the same in such a manner that very thin metal may be employed therein. Moreover, the corrugations enable the location of a valve stem opening 24—24' in closer proximity to the side flange of the tire rim 10 from which the valve stem 8 projects. It is very desirable to have the cover portion 20—20' in as close proximity to the flanges of the rim part as is feasible consistent with the appearance desired, so that a relatively short valve stem may be employed.

In both forms of the invention, the cover may be easily removed from the wheel by prying the hub cap 16 off of the spring clips through the means of a suitable pry-off tool such as a screw driver, as is well known in the art.

I claim as my invention:

1. In a cover structure for a wheel including a tire rim and a body part, a cover including inner and outer cover portions extending in substantially divergent relation from an annular axially outward opening junction groove, the outer portion being dimensioned to extend in concealing relation to the tire rim and having its junction portion opposite the body part, said inner portion extending inwardly in concealing relation to the body part and having a generally radially outwardly facing shoulder at the junction and an outwardly opening groove at the axially outer side of said shoulder, and a reinforcing annular bead having an underturned outer edge bottomed in said junction groove and an underturned inner edge resting in said groove in the inner cover portion, said shoulder having radially outwardly protruding retaining bumps behind which said turned inner edge of the reinforcing bead is engaged in snap-on relationship.

2. In a cover structure for a wheel including a tire rim and a body part, a cover including an outer annular portion for disposition over the tire rim and having a reinforcing corrugation therein, an inner cover portion convergently united with said outer cover portion in a manner to provide a generally axially outwardly opening juncture groove and arranged for disposition over the body part, said inner cover portion having a generally radially facing shoulder at said junction, retaining bumps extending radially outwardly from said shoulder, and a reinforcing bead extending into said junction groove and engaging in snap-on relationship with said bumps.

3. In a cover structure for a wheel including a tire rim and body part, a cover including an outer annular portion for disposition over the tire rim and an inner cover portion joining said outer portion convergently and providing therebetween an axially outwardly opening groove, an annular reinforcing bead bottomed in said groove, means extending radially from one of said cover portions adjacent to the bottom of the groove for retaining engagement by the outer edge of the bead, said bead having a turned inner edge, and said inner cover portion having a groove therein receptive of said turned inner bead edge.

4. In a wheel structure including tire rim and body parts, said body part having a dished central portion including hub cap retaining clips, a cover member having divergently related annular portions including a junction groove opening generally axially outwardly, the outer annular cover portion having a reinforcing corrugation and being disposed over the tire rim and the inner cover portion being disposed over the body part and having its inner edge adjacent to said retaining clips, a hub cap engaging in snap-on relation with said clips and clamping said inner cover portion to the body part, and a reinforcing bead secured in said junction groove with its outer edge bottomed therein.

5. In a cover structure for a wheel including a tire rim and a body part, a cover including an outer annular portion for disposition over the tire rim and an inner cover portion for disposition over the body part, said cover portions being convergently related, the outer cover portion being annularly corrugated for rigidity, said inner cover portion being formed adjacent to the junction of the cover portions with a plurality of angular reinforcing flanges, and a reinforcing bead secured to said flanges and having an edge bottomed in said junction.

6. In a cover structure for a wheel including a tire rim and a body part, a cover including an outer annular portion for disposition over the tire rim and an inner cover portion for disposition over the body part, said cover portions being convergently related and providing an axially outwardly opening groove therebetween, the outer cover portion being annularly corrugated for rigidity, said inner cover portion being formed adjacent to the junction of the cover portions with a plurality of angular reinforcing flanges, and a reinforcing bead secured to said flanges and having an edge bottomed in said junction groove, the corrugations in said outer cover portion being of substantial depth, and one of said corrugations having an aperture through the bottom thereof through which the free end of a valve stem is adapted to extend.

GEORGE ALBERT LYON.

REFERENCES CITED

The following references are of record in the file of this patent:

UNITED STATES PATENTS

| Number | Name | Date |
|---|---|---|
| 2,124,789 | Lyon | July 26, 1938 |
| 2,212,037 | Lyon | Aug. 20, 1940 |
| 2,244,014 | Lyon | June 3, 1941 |
| 2,279,704 | Davenport | Apr. 14, 1942 |
| 2,298,669 | Wood | Oct. 13, 1942 |